United States Patent
Zhang et al.

(10) Patent No.: US 10,839,091 B2
(45) Date of Patent: Nov. 17, 2020

(54) PROTECTION OF DATA PRIVACY FOR COGNITIVE DEMAND FORECASTING

(71) Applicant: International Business Machines Corporation, Armonk, NY (US)

(72) Inventors: Xu Nan Zhang, Beijing (CN); Ming Chao Wan, Beijing (CN); Miao He, Beijing (CN); Lin Tang, Beijing (CN); Yue Tong, Beijing (CN); Bing Shao, Beijing (CN); Changrui Ren, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 15/831,418

(22) Filed: Dec. 5, 2017

(65) Prior Publication Data
US 2019/0171833 A1    Jun. 6, 2019

(51) Int. Cl.
| | |
|---|---|
| H04L 29/06 | (2006.01) |
| G06F 21/62 | (2013.01) |
| H04L 9/06 | (2006.01) |
| G06Q 30/02 | (2012.01) |

(52) U.S. Cl.
CPC ...... *G06F 21/6218* (2013.01); *G06F 21/6254* (2013.01); *H04L 9/0618* (2013.01); *H04L 63/0428* (2013.01); *G06Q 30/0202* (2013.01)

(58) Field of Classification Search
CPC ............ G06F 13/00; H04L 1/00; H04B 17/00
See application file for complete search history.

(56) References Cited

U.S. PATENT DOCUMENTS

| | | | |
|---|---|---|---|
| 8,285,681 B2 | 10/2012 | Prahlad | |
| 8,832,808 B2 | 9/2014 | Liu | |
| 8,892,867 B1 | 11/2014 | Bucu | |
| 2011/0046970 A1* | 2/2011 | Fontenot | G06Q 30/0269 705/2 |
| 2016/0087790 A1 | 3/2016 | Karame | |

FOREIGN PATENT DOCUMENTS

CN        102075542 A       5/2011

OTHER PUBLICATIONS

Wang et al., "Privacy-Preserving Public Auditing for Data Storage Security in Cloud Computing", 2010 proceedings IEEE INFOCOM, Mar. 14-19, 2010, San Diego, CA, USA, 9 pages.

* cited by examiner

*Primary Examiner* — Joseph P Hirl
*Assistant Examiner* — Leynna Truvan
(74) *Attorney, Agent, or Firm* — Stephen R. Yoder (57) ABSTRACT

Machine logic (for example, software) for protecting sensitive and confidential user data and sending the protected user data to an authorized third party for predictive analytics purposes. The machine logic rules perform linear transformation operations on the sensitive and confidential user data in order to obscure the underlying data before it is sent to an authorized third party for performing predictive analysis of the underlying data. After performing predictive analysis on the obscured data by the authorized third party, the owner of the sensitive and confidential data takes a consequential action (that is, the owner of the data makes a business-related decision) based on the prediction.

12 Claims, 9 Drawing Sheets

```
ENTER SALES DATA FOR LAST FOUR MONTHS: 1, 2, 3, 4
ENTER LINEAR TRANSFORM OPERATIONS: M, S
ENTER MULTIPLICATION FACTOR: 2
ENTER SUBTRACTION SHIFT: 1
OBSCURED TIME SERIES DATA SET IS: 1, 3, 5, 7
OKAY TO SEND TO 3D PARTY? Y
SENDING OBSCURED DATA . . .
```

```
ANALYSIS RESULTS RECEIVED FROM 3D PARTY
PREDICTED SALES FOR NEXT MONTH,
OBSCURED RESULT: 9
PERFORMING ANTI - TRANSFORMATION . . .
PREDICTED SALES: (9 + 1) / 2 = 5

RESPONSIVE ACTIONS
ALERT MANUFACTURING DIVISION TO INCREASE
RAW MATERIAL ORDERS BY 25%

ALERT WAREHOUSING DIVISION TO INCREASE
STORAGE SPACE BY 25%
```

$$C = \begin{bmatrix} 0 & 1 & \cdots & 1 \\ \vdots & \vdots & \ddots & \vdots \\ 1 & 1 & \cdots & 0 \end{bmatrix}_{m \times m}$$

FIG. 8A $$A = \begin{bmatrix} a_1 & \cdots & 0 \\ \vdots & \ddots & \vdots \\ 0 & \cdots & a_m \end{bmatrix}_{m \times m}$$

FIG. 8B $$B = [b_1, \ldots, b_m]$$

| | SKU1 | SKU2 | SKU3 | SKU4 |
|---|---|---|---|---|
| SD (Δ/y) | 14.27% | 15.59% | 8.12% | 10.11% |
| rep=1 | -1.51% | 7.35% | 1.10% | -9.61% |
| rep=10 | -0.54% | 2.43% | -0.75% | -4.31% |
| rep=100 | -0.38% | 3.77% | -0.11% | -2.11% |
| rep=1000 | -0.35% | 3.42% | -0.20% | -1.98% |
| | SKU5 | SKU6 | SKU7 | |
| SD (Δ/y) | 7.47% | 7.05% | 11.77% | |
| rep=1 | 3.35% | 0.00% | -3.01% | |
| rep=10 | 3.92% | 2.77% | 4.53% | |
| rep=100 | 0.16% | 1.18% | 2.81% | |
| rep=1000 | 0.18% | 0.59% | 2.51% | |

FIG. 10

PROTECTION OF DATA PRIVACY FOR COGNITIVE DEMAND FORECASTING

BACKGROUND

The present invention relates generally to the field of software for protecting confidential user data against unauthorized access.

A transformation is a function that maps a set to itself. In other areas of mathematics, a transformation can be any function, regardless of the function's domain and/or codomain. Typically, mathematical transformations include the following types: (i) linear transformations; (ii) affine transformations; (iii) rotations; (iv) reflections; and (v) translations. Transformations include mathematical operations that can be performed through the use of linear algebra (that is, these mathematical operations can be performed and/or described by using matrices).

SUMMARY

According to an aspect of the present invention, there is a method that performs the following operations (not necessarily in the following order): (i) receiving a first time-series data set, with the first time-series data set including: (a) a plurality of time-series values, and (b) a relative order of the first plurality of time-series values; (ii) performing a linear transformation on the first time-series data set to obtain a first transformed time series data set, with the linear transformation being a set of mathematical operation(s) that: (a) change each value of the first plurality of time-series values respectively corresponding transformed values, and (b) maintains, in the transformed values, proportions that exist among and between the values of the first plurality of time-series values; (iii) sending, over a communication network and to a remote computer device, the transformed time-series data set for analysis; (iv) receiving, over the communication network and from the remote computer device, analysis results; (v) for each given analysis-result value of the set of analysis result value(s), performing a transformation compensation on the given analysis-result value to yield a respectively corresponding anti-transformed analysis result value, with the transformation compensation being a set of mathematical operation(s) that cause the anti-transformed analysis result value to at least substantially match an analysis result value that would have been obtained if the first time-series data set had been sent for analysis; and (vi) taking a business related action based, at least in part, upon the business related prediction.

According to an aspect of the present invention, there is a method that performs the following operations (not necessarily in the following order): (i) receiving a first time-series data set, with the first time-series data set including: (a) a plurality of time-series values, and (b) a relative order of the first plurality of time-series values; (ii) receiving a second time-series data set, with the second time-series data set including: (a) a plurality of time-series values, and (b) a relative order of the second plurality of time-series values; (iii) combining by a mathematical operation respectively corresponding pairs of time-series values from the first and second time-series data sets to obtain a combined time-series data set; (iv) sending, over a communication network and to a remote computer device, the combined time-series data set for analysis; (v) receiving, over the communication network and from the remote device, analysis results; (vi) for each given analysis-result value of the set of analysis result value(s), performing a combination compensation on the given analysis-result value to yield a respectively corresponding anti-combined analysis result value, with the combination compensation being a set of mathematical operation(s) that cause the anti-combined analysis result value to at least substantially match an analysis result values that would have been obtained if the first time-series data set and the second time-series data set had been separately sent for analysis; (vii) taking a business related action based, at least in part, upon the business related prediction; and (viii) receiving a third time-series data set, with the third time-series data set including: (a) a plurality of time-series values, and (b) a relative order of the third plurality of time-series values. According to this aspect of the present invention, the combination by a mathematical operation further combines the time series values of the third time-series data sets with the time-series values from the first and second time-series data sets to obtain the combined time-series data set.

According to an aspect of the present invention, there is a method that performs the following operations (not necessarily in the following order): (i) receiving a first time-series data set, with the first time-series data set including: (a) a plurality of time-series values, and (b) a relative order of the first plurality of time-series values; (ii) receiving a second time-series data set, with the second time-series data set including: (a) a plurality of time-series values, and (b) a relative order of the second plurality of time-series values; (iii) performing a first linear transformation on the first time-series data set to obtain a first transformed time series data set, with the linear transformation being a set of mathematical operation(s) that: (a) change each value of the first plurality of time-series values respectively corresponding transformed values, and (b) maintains, in the transformed values, proportions that exist among and between the values of the first plurality of time-series values; (iv) performing a second linear transformation on the first time-series data set to obtain a second transformed time series data set, with the linear transformation being a set of mathematical operation(s) that: (a) change each value of the first plurality of time-series values respectively corresponding transformed values, and (b) maintains, in the transformed values, proportions that exist among and between the values of the first plurality of time-series values; (v) combining by a mathematical operation respectively corresponding pairs of time-series values from the first transformed and second transformed time-series data sets to obtain a combined time-series data set; (vi) sending, over a communication network and to a remote computer device, the combined time-series data set for analysis; and (vii) receiving, over the communication network and from the remote computer device, analysis results.

According to an aspect of this invention, the method further includes the following operations (not necessarily in the following order): (i) for each given analysis-result value of the set of analysis result value(s), performing a combination compensation on the given analysis-result value to yield a respectively corresponding anti-combined analysis result value, with the combination compensation being a set of mathematical operation(s) that cause the anti-combined analysis result value to at least substantially match an analysis result values that would have been obtained if the first transformed time-series data set and the second transformed time-series data set had been separately sent for analysis; and (ii) for each given anti-combined result value of the set of anti-combined result value(s), performing a transformation compensation on the given analysis-result value to yield a respectively corresponding anti-transformed analysis result value, with the transformation compensation being a set of mathematical operation(s) that cause the anti-transformed analysis result value to at least substantially match an analysis result value that would have been obtained if the first time-series data set and second time-series data set had been sent for analysis.

DETAILED DESCRIPTION

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
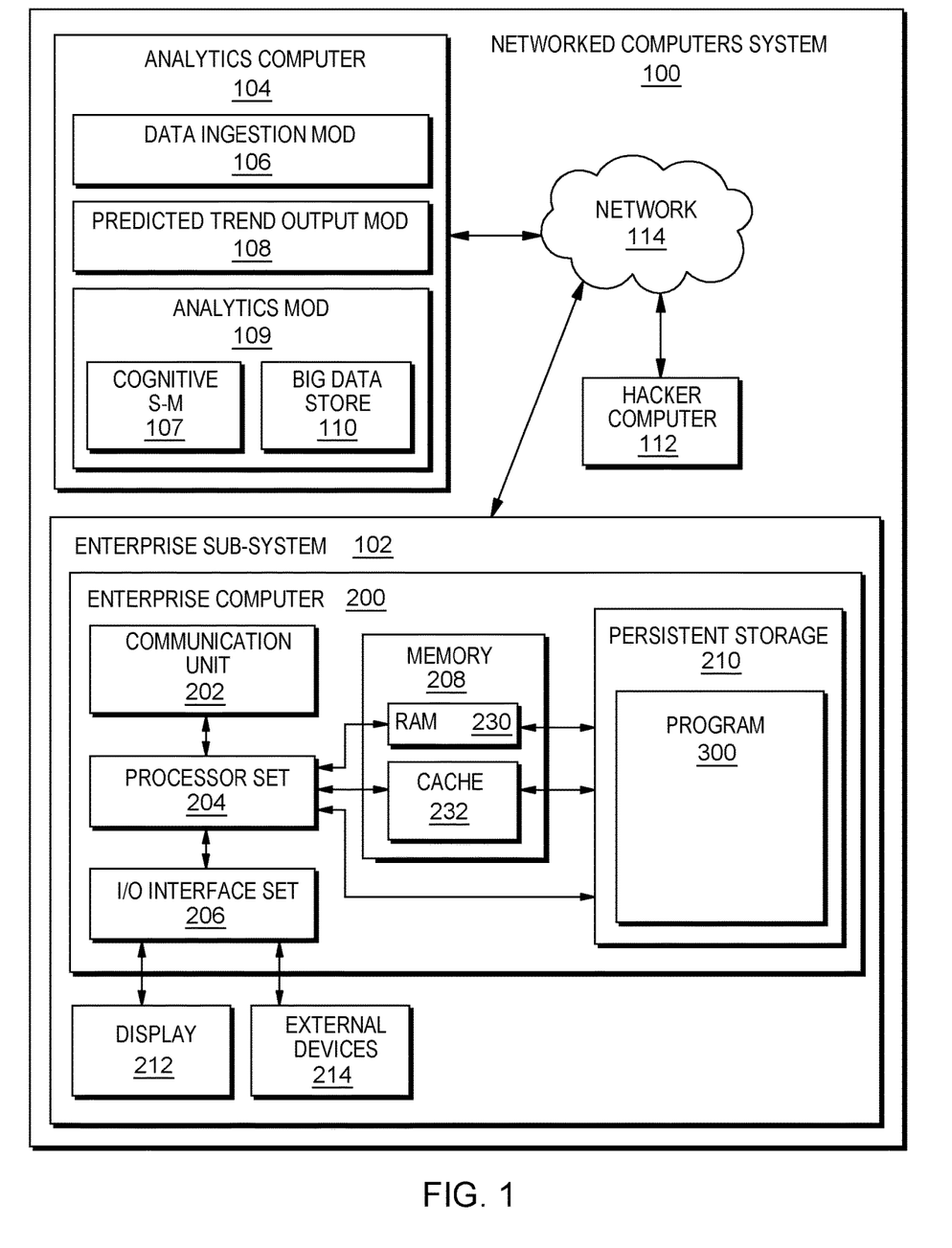
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: enterprise sub-system 102; analytics computer 104; hacker computer 112; communication network 114; enterprise computer 200; communication unit 202; processor set 204; input/output (I/O) interface set 206; memory device 208; persistent storage device 210; display device 212; external device set 214; random access memory (RAM) devices 230; cache memory device 232; and program 300. Analytics computer 104 includes: data ingestion module 106; predicted trend output module 108; and analytics module 109. Analytics module 109 includes cognitive sub-module 107 and big data store 110.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
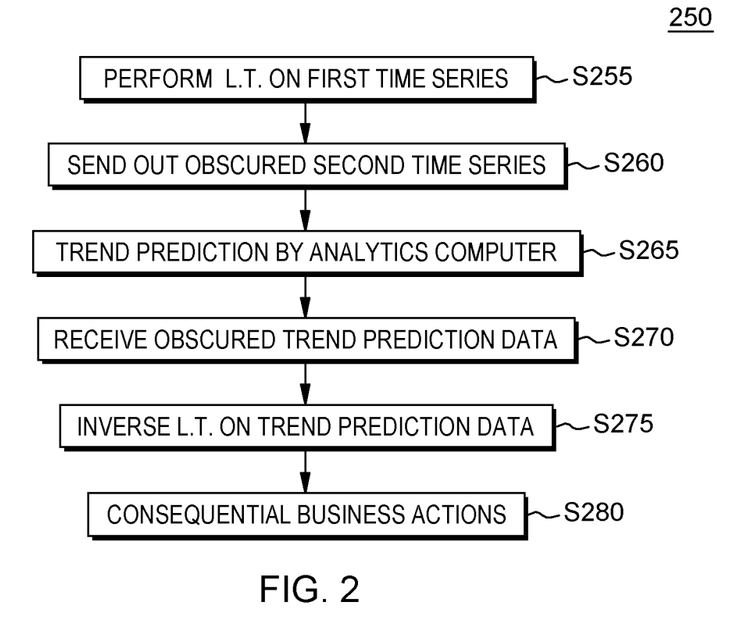
FIG. 2 is a flowchart showing a first embodiment method performed, at least in part, by the first embodiment system.
Figure 3:
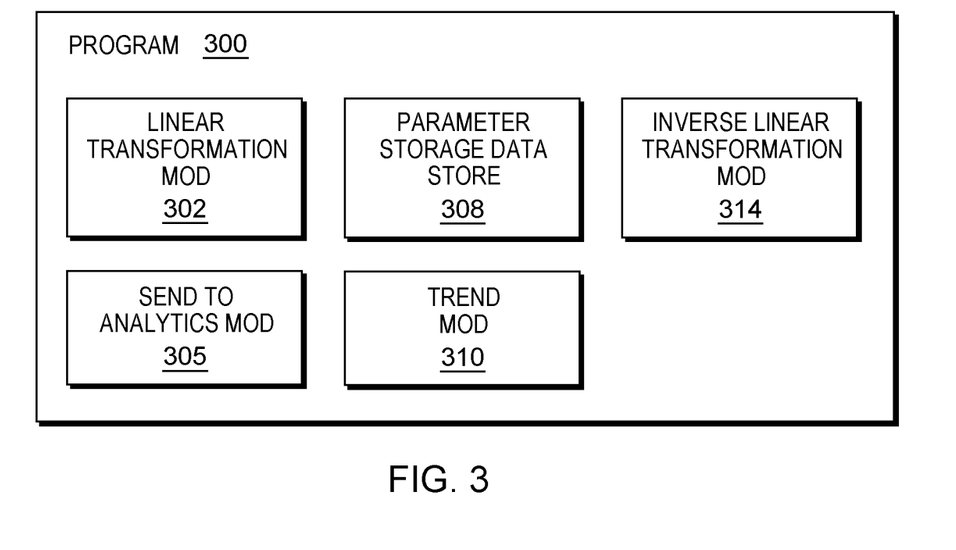
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where linear transformation module ("mod") 302 performs a linear transformation operation on first time series 216. In this embodiment and as shown in screenshot 400a of FIG. 4A, a user has entered time series values of 1, 2, 3 and 4, which respectively represent units sold by the user's enterprise. These time series values are confidential business data. They are stored as values A1, A2, A3, A4 on disk drive array 215 of enterprise sub-system 102 (see FIGS. 1 and 4C). Because enterprise sub-system 102 is secure from intrusions by hacker computer 112, the confidential time series sales data is maintained in secrecy.

A linear transformation: (i) changes each value of the time series to a respectively corresponding transformed value; and (ii) maintains, in the transformed values, proportions that exist among and between the values of the first plurality of time-series values.

Some mathematical operations that may be involved in a linear transformation are as follows: (i) addition of a constant value to all values of a time series; (ii) subtraction of a constant value from all values of a time series; (iii) multiplication by a constant value of all values of a time series; and/or (iv) division by a constant value of all values of a time series. An example of a mathematical operation that is not a transformation would be squaring all the values of the time series because this would not maintain proportionality among and between the values of the time series.

Figure 4A:
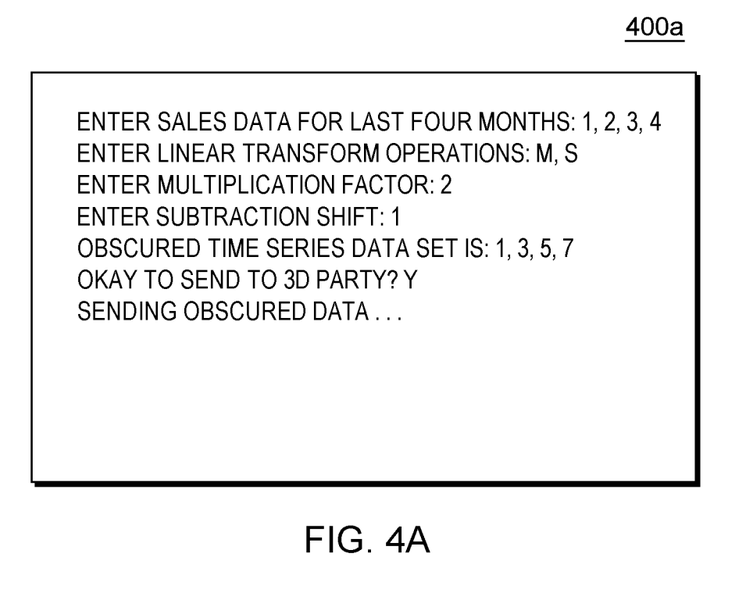
FIG. 4A is a screenshot view generated by the first embodiment system.
Figure 4B:
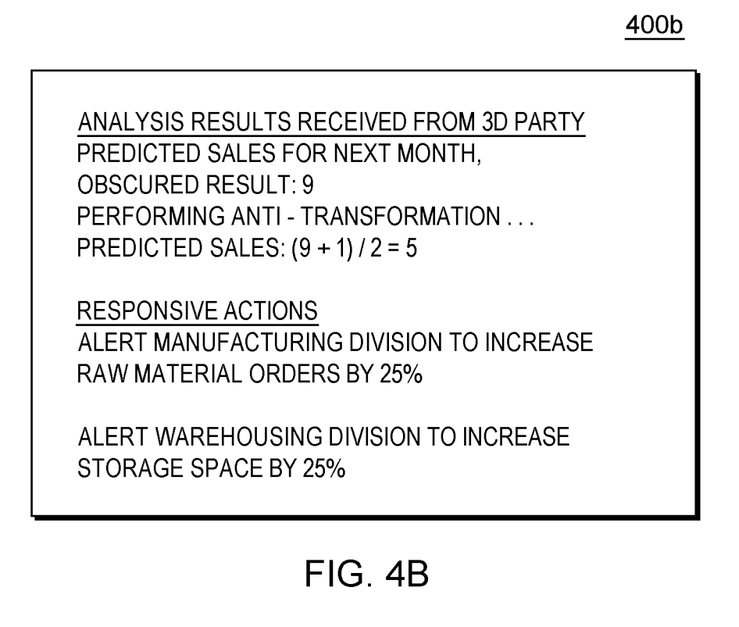
FIG. 4B is a screenshot view generated by the first embodiment system.
Figure 4C:
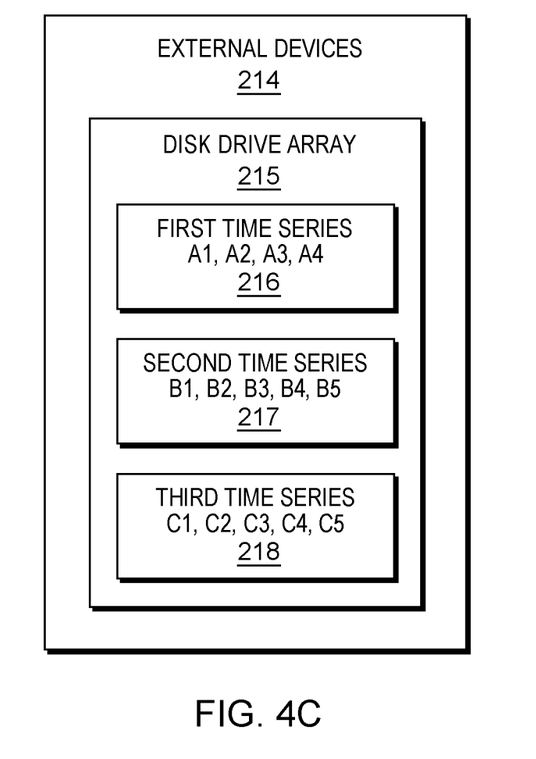
FIG. 4C is a screenshot view generated by the first embodiment system.

In this example, and as shown in screenshot 400a and disk drive array 215 of external devices 214, the user has chosen a linear transformation for the first time series data A1, A2, A3, A4 that: (i) multiplies each value of the first time set by 2; and (ii) then subtracts 1 from that value to yield the first transformed time series values. As shown in FIGS. 4A and 4C, these linearly transformed values (B1=A1*2−1=1, B2=A2*2−1=3, B3=A3*2−1=5, and B4=A4*2−1=7) as second time series 217 in the enterprise's secure disk drive array 215. During operation S255, parameter storage data store 308 stores the mathematical operations, and the order of operations, of the linear transform (that is multiply by 2 and then subtract 1), which stored information will become important later in method 250.

In this example, the user determines the mathematical operations of the linear transformation. Alternatively, these operations, and the order of these operations, may be selected automatically by software.

Processing proceeds to operation S260, where send to analytics mod 306 sends the second time series values through communication network 114 to analytics computer 104. The communication networks and the analytics computer are not under control of the enterprise which means that the second time series data B1, B2, B3, B4 could be exposed to the hacker operating hacker computer 112. However, because the second time series has been obscured by the linear transformation, the enterprise's confidential sales data will not be exposed to unauthorized third parties even if the second time series is discovered through hacking. It is noted that the enterprise wants to send the time series out to analytics computer 104, which is not controlled and secured by the enterprise because it has computing power, machine logic and access to data that none of the computers of the enterprise have, meaning that it can do powerful, insightful, refined and accurate trend analysis that are beyond the means of the enterprise itself. However, instead of sending the actual enterprise sales data, the linearly transformed data is sent in its stead to get the benefit of good analytical trend analysis, while still maintaining security in its secret sales data.

In this example, and as shown in screenshot 400a, the user directs mod 306 to send the second time series data to analytics computer 104. Alternatively, this obscured data could be sent out automatically under the control of software.

Processing proceeds to operation S265, where analytics computer 104 performs trend analysis on the second time series data it received from the enterprise. The powerful analytics of this machine predict that the next month's sales will be 9 units, based on the obscured time series input values of B1=1, B2=3, B3=5 and B4=7.

Processing proceeds to operation S270, where analytics computer 104 send its obscured trend prediction (that is, next month's sales predicted to be 9 units), which is based on the obscured time series data, back through communication network 114 to trend mod 310.

Processing proceeds to operation S275 where inverse linear transformation mod 314 performs an inverse linear transformation on the trend prediction value based on the linear transformation parameters stored in parameter storage data store 308. As shown in screenshot 400b of FIG. 4B, this means that the inverses of the mathematical operations of the linear transform are performed on the trend prediction value in reverse order. More specifically, in this example: (i) first 1 is added to the trend prediction value; (ii) then that intermediate value is divided by 2; and (iii) to yield a non-obscured trend prediction value of 5 units predicted to be sold next month.

Processing proceeds to operation S280 where the user at the enterprise instructs consequential business actions to be taken. As shown in screenshot 400b of FIG. 4B, in this example, the consequential business actions are as follows: (i) increase raw material orders; and (ii) increase warehouse space.

In some embodiments the confidential time series data A1, A2, A3, A4 can be combined with another confidential time series having the same number of time series values (see FIG. 4C at third time series 218) to obscure the data before it is sent to unsecured networks and/or computers. For example, the time series may be combined additively or subtractively.

Then, when the trend prediction value is received back, it can be split into two components, with: (i) one component representing a trend prediction for one of the combined time series; and (ii) another component representing a trend prediction for the other of the combined time series.

The splitting of the trend prediction into two components will now be discussed. When the prediction value is received back, embodiments of the present invention do an inverse transformation to recover the forecasting result. For example, there are two SKUs X1 and X2, the prediction steps are as follows:
(i) Random generate matrix A, B and C such as:

$$A = \begin{bmatrix} 1 & 0 \\ 0 & 1 \end{bmatrix}, B = [0\ 0], \text{ and } C = \begin{bmatrix} 1 & 2 \\ 1 & 1 \end{bmatrix}$$

(ii) Linear transformation for X1 and X2, obtaining Y1 and Y2:

$Y1 = X1 + X2$ and $Y2 = 2X1 + X2$,

Using the prediction on Y1 and Y2, we can get $Z^{Y1}$ and $Z^{Y2}$. Then, an inverse transformation $Z^X = (Z^Y - B)(CA)^{-1}$ works on $Z^{Y1}$ and $Z^{Y2}$ to recover the forecasting result $Z^{X1}$ and $Z^{X2}$:

$Z^{X1} = Z^{Y2} - Z^{Y1}$, and $Z^{X2} = 2Z^{Y1} - Z^{Y2}$

After the trend prediction value is split into components, that is sometimes referred to herein as "anti-combined analysis results values."

Both linear transformation and combination of multiple time series may be used in tandem in some embodiments of the present invention, as will be further discussed in the following sub-section of this Detailed Description section.

III. Further Comments and/or Embodiments

Some embodiments of the present invention recognize the following facts, potential problems and/or potential areas for improvement with respect to the current state of the art: (i) in the retail industry or fast-moving consumer goods (FMCG) fields, clients are more likely to use cognitive models in the cloud (such as cloud platform that help solve real problems and drive business value with applications, infrastructure and services) when dealing with demand forecasting-related problems; (ii) some enterprise clients do not want to put their raw data in the cloud because accidental or deliberate disclosure could happen to the this sensitive, confidential and/or secret data; (iii) ensuring that data will not be disclosed or stolen by the cloud service provider (and/or third parties who make unauthorized access to the cloud by hacking or the like) has become a hot issue in the cognitive cloud computing field; (iv) data is located in different places when using the cloud services and data privacy protection is a main factor of user's concerns about the cloud technology; (v) in commerce, consumer's data and privacy should be protected and used appropriately; (vi) users do not want to send the original data to the cloud service; (vii) accidental or deliberate disclosure may happen to the user data, even including privacy-related content during remote computing, storage, or communication; (viii) thus, many clients would not like to choose cloud service instead of a traditional computing model; (ix) for unreliable cloud infrastructures and service providers, additional charges are imposed on users through the data they obtain; and/or (x) when large-scale commercial users use the private sector resources to provide cloud computing services, this potentially causes enhanced security issues.

Some embodiments of the present invention recognize the following facts, potential problems and/or potential areas for improvement with respect to the current state of the art: (i) with respect to cloud-based services and cloud-based platforms, data privacy of the client is not addressed, particularly with respect to cognitive demand forecasting services in the cloud; (ii) for large amounts of data (as used in Big Data applications), data retrieval efficiency is reduced, system availability sharply declines, and prediction models cannot directly use the encrypted data; and/or (iii) due to the addition of third-party auditors and audit rules-setting by those third-party auditors, functions of a cloud-based platform and/or service such as implementation and revision will reduce the overall performance of the cloud-based platform and/or service.

Some embodiments of the present invention may include one, or more, of the following features, characteristics and/or advantages: (i) using asymmetric data desensitization techniques to achieve data protection; (ii) the clients can transform their raw data on their local database and then compute the predicted results by simple inverse matrix operations; (iii) no additional processing is required by the cloud service providers; (iv) cloud service providers (or unauthorized parties) cannot crack, or otherwise perform reverse transformation techniques, to the transformed data in order to determine the raw data; (v) protecting client's data privacy when using cognitive demand forecasting service in the cloud, while not necessarily limited to storing the clients' data; (vi) using linear transformation techniques on the numerical data by constructing a diagonal matrix and a vector for data desensitization treatment; and/or (vii) dealing with the data privacy problem when using cognitive demand forecasting service in the cloud.

Some embodiments of the present invention may include one, or more, of the following features, characteristics and/or advantages: (i) applicable to raw data generated by the retail industry and the field of fast-moving consumer goods (FMCG) (for example, predict next day/month/year's demand for each stock keeping unit (SKU)); (ii) use the demand forecasting model in the cloud service, such as use in the context of cloud platforms as a service; (iii) improve safety performance when using cloud platforms as a service for cognitive demand forecasting; and/or (iv) increase customer confidence in data security.

Some embodiments of the present invention may include one, or more, of the following features, characteristics and/or advantages: (i) using asymmetric data desensitization techniques to achieve data protection; (ii) as used herein, "desensitization" means protecting sensitive (that is, "sensitive with respect to confidentiality concerns) data by substituting other, validly formatted values for that data; (iii) transforming the clients' raw data on their local databases; (iv) computing the predicted results by simple inverse matrix operations; (v) no additional processing to protect data confidentiality (for example, encryption) is required by cloud service providers; and/or (vi) cloud service providers that receive desensitized data will not be able to readily derive the sensitive raw data based upon the desensitized data by "cracking" the transformation algorithm.

Some embodiments of the present invention may include one, or more, of the following features, characteristics and/or advantages: (i) applying asymmetric data desensitization techniques to any context if the owner of the data wants to protect their confidential, sensitive and/or secretive data from being accessed by a third-party that is not authorized to access the data; (ii) using asymmetric data desensitization techniques to "transform" data (as opposed to encrypting the data) so that the transformed data can be directly input to a predictive or analytics set of algorithm(s) to derive meaningful insights, trends, etc. from the transformed data without direct use of the raw data; (iii) in some embodiments, transforming sensitive data uses "collaborative processing" (for example, multiple data points are summed, and the sum total of the multiple data points is amplified); (iv) when performing a transformation technique on the data, as long as the transformation matrix is full rank, the data provider can estimate the true predicted value; (v) estimation of the true predicted value is based, at least in part, upon on the predicted transform value that is given by the algorithm provider; and/or (vi) the transformed value is calculated based on multiple raw data points.

Some embodiments of the present invention may include one, or more, of the following features, characteristics and/or advantages: (i) in some embodiments, transforming data involves determining whether the parameters of a given data masking algorithm need to be changed; (ii) in some embodiments, the transformation algorithm intermittently changes parameters and/or mathematical operation(s) of the transformation in order to ensure that the raw sales-related data cannot be derived from the desensitized data; and/or (iii) frequently changing mathematical operations and/or parameters of mathematical operations of the transformation in order to better mask sensitive data underlying the desensitized data. As an example of the feature of item (iii) in the foregoing list, an owner of raw sales-related data wants to predict future sales of products respectively associated by three SKUs, where $s1_1$, $s2_1$ and $s3_1$ are three times series of actual, historical sales data, for a first time period, respectively associated with the three (3) SKUs. Before sending the first period sales data to the cloud for application of third party analytics, the owner specifies a first set of transformation operations and parameters, called f, and applies them to observed sales for the three SKUs as follows: $f(s1_1)$, $f(s2_1)$, and $f(s3_1)$). Later, sales for the tree (3) SKUs are collected with respect to a second time period (that is, $s1_2$, $s2_2$ and $s3_2$ respectively for the three SKUs). The owner specifies a second set of transformation operations and parameters, called g, and applies them to observed sales for the three SKUs as follows: $g(s1_2+s2_2)$, $g(s2_2+s3_2)$, and $g(s3_2)$). In this example, there are two differences between the transformation algorithm for the first period and the transformation for the second period as follows: (a) f( ) and g( ) involve different mathematical operations and/or parameters; and (b) the transformation algorithm for the second period sums data from different SKUs as input data to the transformation operations (that is, $(s1_2+s2_2$ and $s2_2+s3_2)$.

Some embodiments of the present invention may include one, or more, of the following features, characteristics and/or advantages: (i) using asymmetric data desensitization techniques to generate a predicted sales demand forecasting result based on time series data in order to protect the data privacy of the raw time series data; (ii) protecting the data privacy of the raw time series data by predicting the price of a particular product at a given time based, at least in part, upon the historic price fluctuation data; (iii) protecting the data privacy of the raw time series data by predicting the number of passengers in a given time period (e.g., for the month of January or for the fourth quarter of the fiscal year); and/or (iv) protecting the data privacy of the raw time series data by predicting the cargo volume that a given vessel used for transporting goods from one location to another can carry for a shipping company.

Some embodiments of the present invention may include one, or more, of the following features, characteristics and/or advantages: (i) protecting confidential, sensitive and/ or secretive raw sales-related data using a quantitative prediction for a value of a forecast variable in the future; (ii) using a given time series of values representing historic data; (iii) using a given time series of values representing non-temporal factors that have a meaningful impact on the predicted value; (iv) the forecast variable is representative of a numeric value and is not representative of a category (for example, the forecast variable can be representative of a given time value, but not representative of a client identification (ID) or a supplier list); (v) using encryption techniques to hide the confidential, sensitive and/or secretive raw sales-related data; (vi) for quantitative prediction, if the owner of the raw sales-related data or an authorized third-party uses the encryption method or some other method improperly, the inner pattern of the data will be permanently changed and the predicted value will be rendered useless when attempting to use the permanently changed inner pattern of the data to perform a transformation operation; (vii) protecting the original raw sales-related data from being inferred or otherwise determined based on transformed data; (viii) submitting the raw sales-related data to the algorithm provider; (ix) determining the true predicted value of the forecast variable based on the predicted value of the transformed data that is output by using the asymmetric data desensitization technique; and/or (x) performing the foregoing method at a local database owned by the owner of the raw sales-related data.

Figure 5:
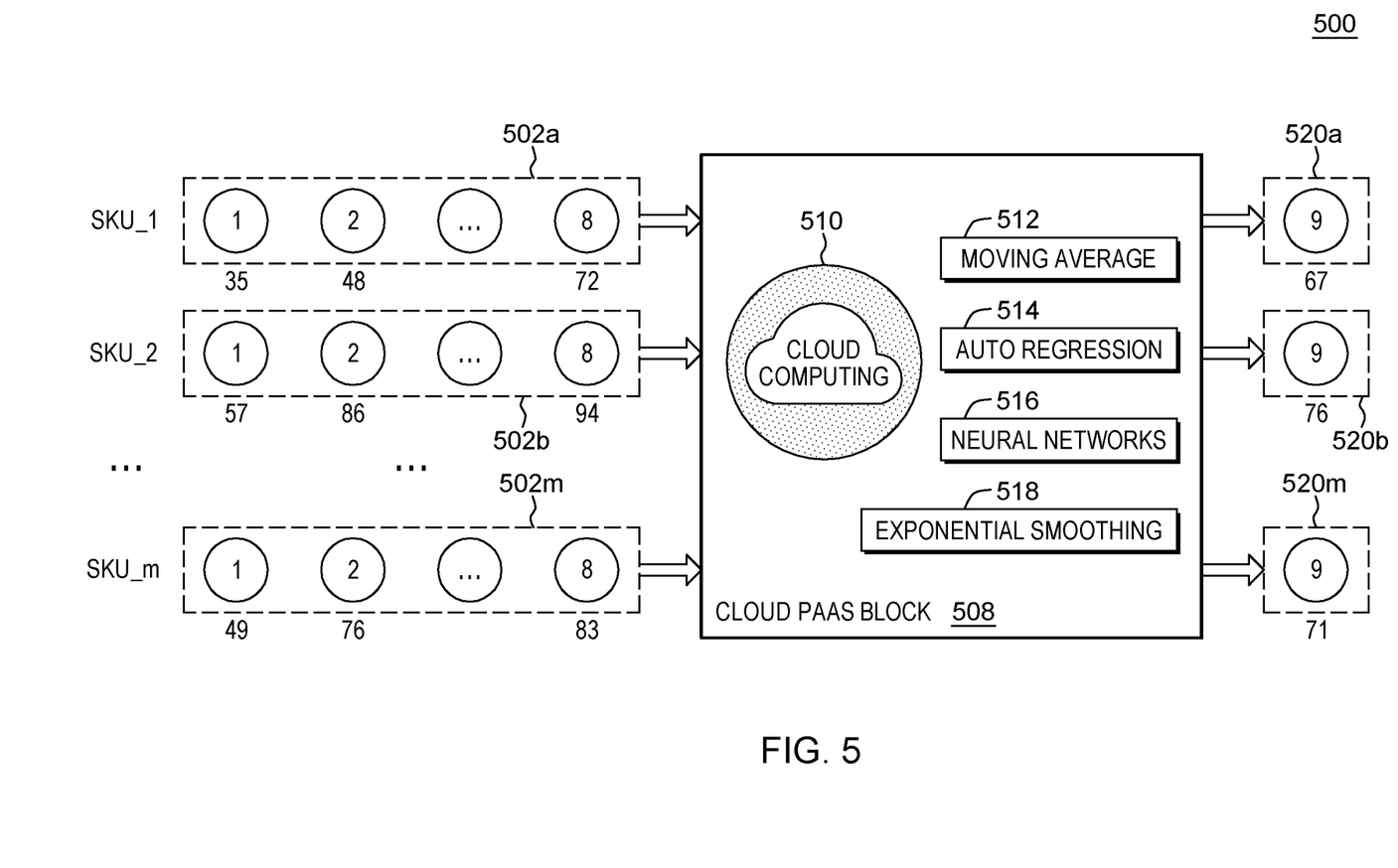
FIG. 5 is a block diagram showing information that is helpful in understanding embodiments of the present invention.

As shown in FIG. 5, block diagram 500 includes: SKU_1 502a; SKU_2 502b; SKU_m 502m; cloud platform as a service (PAAS) block 508; output block 520a; output block 520b; and output block 520m. Block 508 includes: cloud computing portion 510; moving average module ("mod") 512; auto regression mod 514; neural networks mod 516; and exponential smoothing mod 518. As those of skill in the art will appreciate, block diagram 500 schematically shows typical demand forecasting scenarios in a cloud. More specifically: (i) each SKU corresponds to a category of product or service (for example, a given smart phone model); (ii) it is desired to forecast demand for each SKU (that is, it is not generally desired to forecast demand for the SKSs collectively); and (iii) as shown in FIG. 5, this kind of forecasting typically requires that sales data for each SKU be sent to the cloud for processing and analysis by the forecasting related machine logic.

Some embodiments of the present invention may include one, or more, of the following features, characteristics and/or advantages: (i) protects data privacy when using the cloud computing platform to solve cognitive demand forecasting problem; (ii) the clients can hide the actual numerical values their sensitive data stored on their local database using linear algebra transformations to yield transformed values; (iii) a third party analytics service provider then compute the forecasting results using, as an input, the transformed values; (iv) while the transformed values hide the actual values of the underlying data, they are still suitable for purposes of the application of analytics (especially, when the output of the analytics is provided to a party that knows how the input data was transformed); and/or (v) this hiding of the actual values of the data, by simple inverse matrix operations, means that the cloud provider (or other unauthorized party(ies)) cannot attack to obtain the sensitive raw data.

Figure 6:
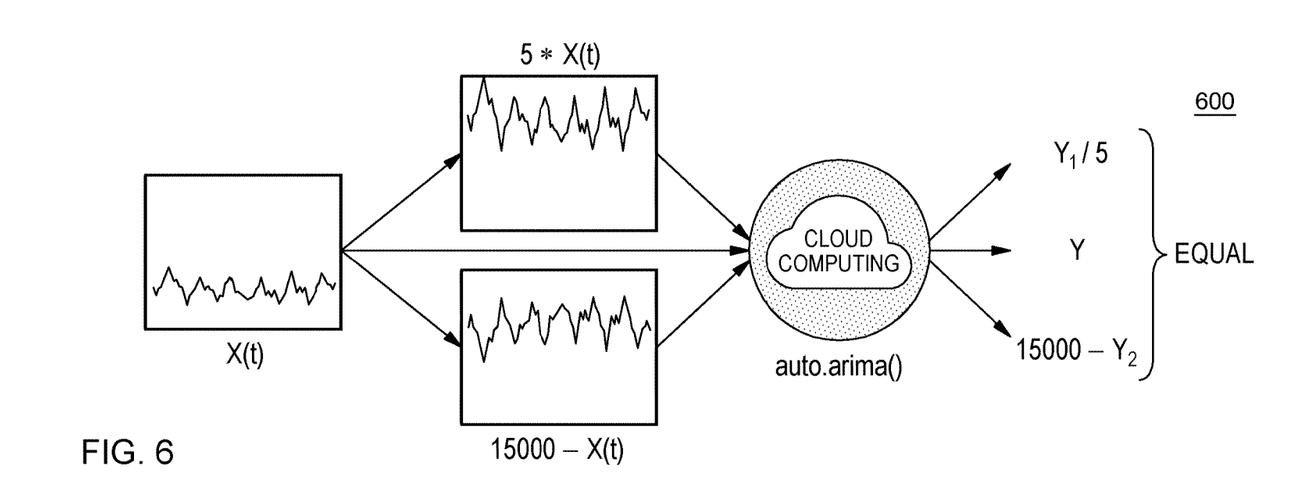
FIG. 6 is a diagram showing information that is helpful in understanding embodiments of the present invention.

As shown in FIG. 6, diagram 600 shows how the use of linearly transformed sales data as input may not sufficiently protect data privacy More specifically, the raw sales data x(t) is shown to be: (i) sent through an auto.arima( ) function in the cloud as raw data Y; (ii) sent through an auto.arima( ) function in the cloud as "scaled data" in the form of a values equal to five times x(t) (which is equal to $Y_1/5$); and (iii) sent through an auto.arima( ) function in the cloud in the form of "inverted and translated data" equal to 15000 minus x(t) (which is equal to 15000 minus Y2). Items (ii) and (iii) in the preceding list are two forms of linear transformation that can be performed on the sensitive, raw sales data to help protect it from being discovered and used by unauthorized parties.

Some embodiments of the present invention may include one, or more, of the following features, characteristics and/or advantages: (i) provides data privacy protection that goes beyond linear transformation; (ii) provides better protection of sales data used to forecast only once (unauthorized parties cannot simply normalize the input data and then get the trend); and/or (iii) provides better protection of sales data used to forecast every week, month, etc. (unauthorized parties cannot learn that the input data comes from the linear transformation of the same historic sales data).

Figure 7:
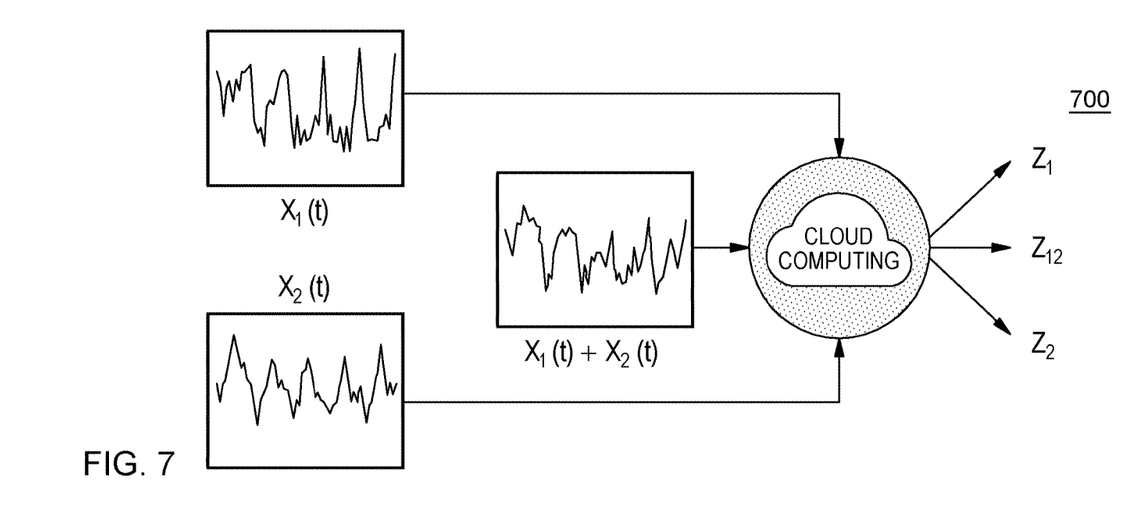
FIG. 7 is a diagram showing information that is helpful in understanding embodiments of the present invention.

As shown in diagram 700 of FIG. 7, to predict the overall sales corresponding to two SKUs, time series of the two SKUs (that is $x_1(t)$ and $x_2(t)$) can be summed before analyzing the sales data for prediction, trend, etc. In the embodiment of numeric study diagram 700, the sales of both of the SKUs are of the same order of magnitude. To achieve this, embodiments of the present invention may: (i) cluster the sales data of various SKUs by magnitude; and/or (ii) normalize the sales data of the various SKU. The embodiment of diagram 700 uses SKU combination and linear transformation together to protect data privacy. Alternatively, other embodiments may combine sales data of more than two SKUs to protect data privacy.

The numeric study diagram 700 was used to perform one hundred (100) simulation runs. These simulation runs showed that $$\frac{|Z_1 + Z_2 - Z_{12}|}{Z_{12}} \in [0.15\%, 1\%].$$

Under the variable naming convention of diagram 700, the expression $(z_{12}-z_2)$ represents the predicted sales of SKU1.

As shown by diagram 700, to predict the overall sales of several SKUs, two approaches are possible: (i) sum up their sales before predicting; or (ii) sum up their predicted sales. It is noted that the sales of all the SKUs must be of the same magnitude. To achieve this, one, or both, of two approaches may be taken: (i) cluster the SKUs by magnitude; and/or (ii) normalize the sales. Clustering the SKUs by magnitude is sometimes herein referred to as "SKU combination." "Normalizing the sales" herein refers to using a linear transformation to protect data privacy.

Figure 8A:
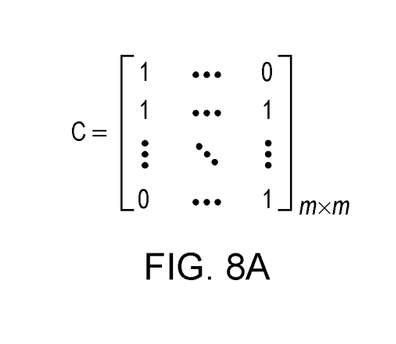
FIG. 8A is a diagram showing information that is helpful in understanding embodiments of the present invention.
Figure 8B:
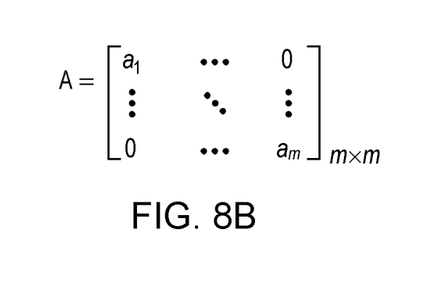
FIG. 8B is a diagram showing information that is helpful in understanding embodiments of the present invention.
Figure 8C:
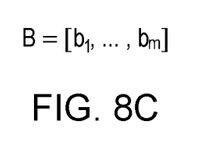
FIG. 8C is a diagram showing information that is helpful in understanding embodiments of the present invention.

Now an embodiment of a method will be discussed. In this method, to protect data privacy, several SKUs are combined, linear transformation is performed, and the result is used as the input of a cognitive demand forecasting program that resides in the cloud. This method is as follows: (i) cluster SKUs by sales magnitude; (ii) as shown in FIG. 8A, for a certain cluster (SKU1, . . . , SKUm), randomly generate a m*m full rank 0-1 matrix C for SKU combination (in FIG. 8A, each column represents an SKU combination—for example, $(1, 1, 0, \ldots, 0)^T$ stands for predicting SKU1 and SKU2 together); (iii) as shown in FIGS. 8B (scaling) and 8C (translation), randomly generate a diagonal matrix A and a vector B for linear transformation on SKU combinations; (iv) do transformation Y=XCA+B, where X is time series data $[x_1(t), \ldots, x_m(t)]$; (v) forecast sales for the new time series $Y=[Y_1(t), \ldots, Y_m(t)]$ using forecasting cloud and get result $Z^Y=[Z^Y_1, \ldots, Z^Y_m]$; (vi) do transformation $Z^X=(Z^Y-B)*(CA)^{-1}$ to recover forecasting result of X; and/or (vii) repeat the foregoing method steps in order to get multiple demand forecasting results and take the average of the demand forecasting results in order to avoid variability.

Now another embodiment of a method will be discussed. In this method, to protect data privacy using a cognitive demand forecasting program that resides in the cloud, clients can protect data privacy by using a technique known as "asymmetric data desensitization" which involves the following key components and steps: (i) cluster SKUs by sales magnitude; (ii) generate a random matrix for combing the SKUs; (iii) for a given SKU, randomly generate a m*m full rank 0-1 matrix C; (iv) randomly generate a diagonal matrix A and a vector B for linear transformation on SKU combinations; (v) perform an inverse transformation to recover forecasting result and/or (vi) repeat the asymmetric data desensitization procedure several times in order to obtain an average result.

Figure 9:
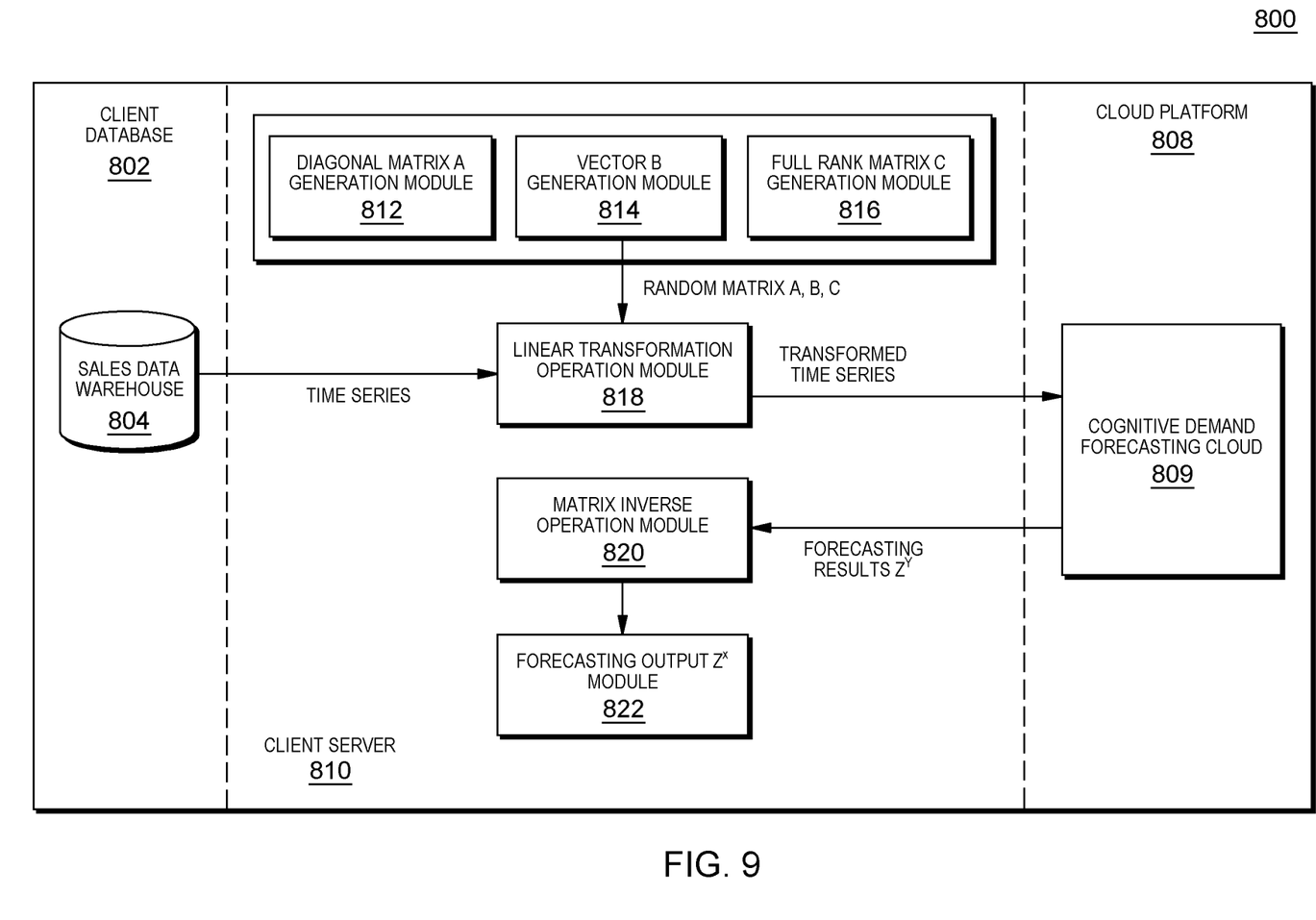
FIG. 9 is a flowchart of a first embodiment of a system according to the present invention.

As shown in FIG. 9, data privacy protection system 800 includes: client database 802, sales data warehouse 804, cloud platform 808, cognitive demand forecasting cloud 809, client server 810, diagonal matrix A generation module ("mod") 812, vector B generation mod 814, full rank matrix C generation mod 816, linear transformation operation mod 818, matrix inverse operation mod 820, and forecasting output $Z^X$ mod 822. As those of skill in the art will appreciate, system 800 schematically represents the logical structure for implementing the mathematical operations of FIGS. 8A-8C for protecting the sensitive and confidential raw sales-related data of the client.

Figure 10:
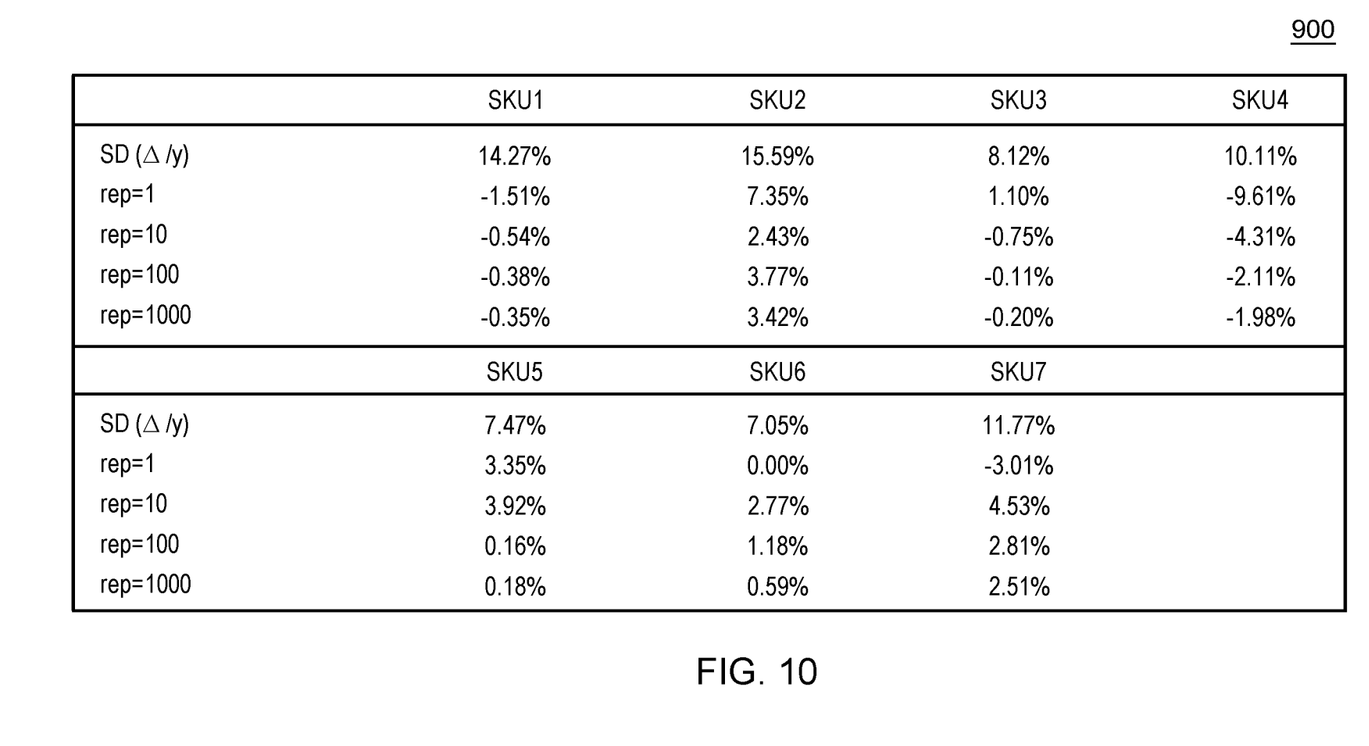
FIG. 10 is a table showing information that is helpful in understanding embodiments of the present invention.

FIG. 10, table 900 shows some example trend prediction data.

Some embodiments of the present invention may include one, or more, of the following features, characteristics and/or advantages: (i) using asymmetric data desensitization techniques to achieve data protection; (ii) cluster SKUs by sales magnitude; (iii) for a given cluster of SKUs, generate random matrices for combining and transforming the raw sales data; (iv) randomly generate a m*m full rank 0-1 matrix C; (v) randomly generate a diagonal matrix A and a vector B for linear transformation on SKU combinations; (vi) do transformation on raw sales X by using the following formula: Y=XCA+B; (vii) input the transformed sales Y into the cloud; (viii) do an inverse transformation on the sales demand forecasting results of transformed data Y to recover the forecasting result of raw sales data X; and/or (ix) repeat the asymmetric data desensitization procedure several times in order to obtain an average result.

Some embodiments of the present invention may include one, or more, of the following features, characteristics and/or advantages: (i) it is applicable to other contexts (besides sales data) where a data owner wants to protect its data from being leaked to an algorithm application provider; (ii) to generate prediction based on time series data, the method applies to protect the raw time series data; (iii) some other types of confidential data (besides sales data include: (a) predict price of a particular product based on the historic price fluctuation, (b) predict the number of passengers in each month/day for the aviation industry, (c) predict the cargo volumes for a shipping company; (iv) the nature of the problem that can be solved with approaches according to the present invention is a quantitative prediction for a value of a variable in the future, given the time series of the past values on this variable plus the time series of impact factors on that value; (v) the variable, who's actual values are hidden by the techniques of the present invention, needs to be numeric, not categorical; and/or (vi) the techniques of the present invention can be applied to protect qualitative, and security sensitive, medical data, where a time series of medical parameter values (for example, blood pressure values, T-cell count values) are used to predict a future value.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
  receiving a first time-series data set, with the first time-series data set including: (i) a plurality of time-series values, and (ii) a relative order of the first plurality of time-series values;
  receiving a second time-series data set, with the second time-series data set including: (i) a plurality of time-series values, and (ii) a relative order of the second plurality of time-series values;
  performing a first linear transformation on the first time-series data set to obtain a first transformed time series data set, with the linear transformation being a first set of mathematical operation(s) that: (i) change each value of the first plurality of time-series values respectively corresponding transformed values, and (ii) maintains, in the transformed values, proportions that exist among and between the values of the first plurality of time-series values;
  performing a second linear transformation on the first time-series data set to obtain a second transformed time series data set, with the linear transformation being a second set of mathematical operation(s) that: (i) change each value of the first plurality of time-series values respectively corresponding transformed values, and (ii) maintains, in the transformed values, proportions that exist among and between the values of the first plurality of time-series values; combining by a mathematical operation respectively corresponding pairs of time-series values from the first transformed and second transformed time-series data sets to obtain a combined time-series data set;

sending, over a communication network and to a remote computer device, the combined time-series data set for analysis;

receiving, over the communication network and from the remote computer device, analysis results including a set of numerical analysis-result value(s);

for each given analysis-result value of the set of analysis result value(s), performing a combination compensation on the given analysis-result value to yield a respectively corresponding anti-combined analysis result value, with the combination compensation being a third set of mathematical operation(s) that cause the anti-combined analysis result value to at least substantially match an analysis result values that would have been obtained in an instance where the first transformed time-series data set and the second transformed time-series data set had been separately sent for analysis; and for each given anti-combined result value of the set of anti-combined result value(s), performing a transformation compensation on the given analysis-result value to yield a respectively corresponding anti-transformed analysis result value, with the transformation compensation being a fourth set of mathematical operation(s) that cause the anti-transformed analysis result value to at least substantially match an analysis result value that would have been obtained in an instance where the first time-series data set and second time-series data set had been sent for analysis.

2. The method of claim 1 wherein:
the first set of mathematical operation(s) of the first linear transformation includes performing a first matrix algebra operation on the values of the first plurality of time-series values; and
the second set of mathematical operation(s) of the second linear transformation includes performing a second matrix algebra operation on the values of the second plurality of time-series values.

3. The method of claim 1 wherein:
the first time-series data is confidential business data; and
the analysis results include a business related prediction.

4. The method of claim 3 further comprising:
taking a business related action based, at least in part, upon the business related prediction, with the business related action including one of the following types of business related actions: taking a staffing action, making an investment, foregoing an investment opportunity, making an inventory decision, and/or making a container allocation decision.

5. A computer program product (CPP) comprising:
a machine readable storage device; and
computer code stored on the machine readable storage device, with the computer code including instructions and data for causing a processor(s) set to perform operations including the following:
receiving a first time-series data set, with the first time-series data set including: (i) a plurality of time-series values, and (ii) a relative order of the first plurality of time-series values,
receiving a second time-series data set, with the second time-series data set including: (i) a plurality of time-series values, and (ii) a relative order of the second plurality of time-series values,
performing a first linear transformation on the first time-series data set to obtain a first transformed time series data set, with the linear transformation being a first set of mathematical operation(s) that: (i) change each value of the first plurality of time-series values respectively corresponding transformed values, and (ii) maintains, in the transformed values, proportions that exist among and between the values of the first plurality of time-series values,
performing a second linear transformation on the first time-series data set to obtain a second transformed time series data set, with the linear transformation being a second set of mathematical operation(s) that: (i) change each value of the first plurality of time-series values respectively corresponding transformed values, and (ii) maintains, in the transformed values, proportions that exist among and between the values of the first plurality of time-series values,
combining by a mathematical operation respectively corresponding pairs of time-series values from the first transformed and second transformed time-series data sets to obtain a combined time-series data set,
sending, over a communication network and to a remote computer device, the combined time-series data set for analysis,
receiving, over the communication network and from the remote computer device, analysis results including a set of numerical analysis-result value(s),
for each given analysis-result value of the set of analysis result value(s), performing a combination compensation on the given analysis-result value to yield a respectively corresponding anti-combined analysis result value, with the combination compensation being a third set of mathematical operation(s) that cause the anti-combined analysis result value to at least substantially match an analysis result values that would have been obtained in an instance where the first transformed time-series data set and the second transformed time-series data set had been separately sent for analysis, and
for each given anti-combined result value of the set of anti-combined result value(s), performing a transformation compensation on the given analysis-result value to yield a respectively corresponding anti-transformed analysis result value, with the transformation compensation being a fourth set of mathematical operation(s) that cause the anti-transformed analysis result value to at least substantially match an analysis result value that would have been obtained in an instance where the first time-series data set and second time-series data set had been sent for analysis.

6. The CPP of claim 5 wherein:
the first set of mathematical operation(s) of the first linear transformation includes performing a first matrix algebra operation on the values of the first plurality of time-series values; and
the second set of mathematical operation(s) of the second linear transformation includes performing a second matrix algebra operation on the values of the second plurality of time-series values.

7. The CPP of claim 5 wherein:
the first time-series data is confidential business data; and
the analysis results include a business related prediction.

8. The CPP of claim 7 further comprising:
taking a business related action based, at least in part, upon the business related prediction, with the business related action including one of the following types of business related actions: taking a staffing action, making an investment, foregoing an investment opportunity, making an inventory decision, and/or making a container allocation decision.

9. A computer system (CS) comprising:
a processor(s) set;
a machine readable storage device; and
computer code stored on the machine readable storage device, with the computer code including instructions and data for causing a processor(s) set to perform operations including the following:
   receiving a first time-series data set, with the first time-series data set including: (i) a plurality of time-series values, and (ii) a relative order of the first plurality of time-series values,
   receiving a second time-series data set, with the second time-series data set including: (i) a plurality of time-series values, and (ii) a relative order of the second plurality of time-series values,
   performing a first linear transformation on the first time-series data set to obtain a first transformed time series data set, with the linear transformation being a first set of mathematical operation(s) that: (i) change each value of the first plurality of time-series values respectively corresponding transformed values, and (ii) maintains, in the transformed values, proportions that exist among and between the values of the first plurality of time-series values,
   performing a second linear transformation on the first time-series data set to obtain a second transformed time series data set, with the linear transformation being a second set of mathematical operation(s) that: (i) change each value of the first plurality of time-series values respectively corresponding transformed values, and (ii) maintains, in the transformed values, proportions that exist among and between the values of the first plurality of time-series values,
   combining by a mathematical operation respectively corresponding pairs of time-series values from the first transformed and second transformed time-series data sets to obtain a combined time-series data set,
   sending, over a communication network and to a remote computer device, the combined time-series data set for analysis,
   receiving, over the communication network and from the remote computer device, analysis results including a set of numerical analysis-result value(s),
   for each given analysis-result value of the set of analysis result value(s), performing a combination compensation on the given analysis-result value to yield a respectively corresponding anti-combined analysis result value, with the combination compensation being a third set of mathematical operation(s) that cause the anti-combined analysis result value to at least substantially match an analysis result values that would have been obtained in an instance where the first transformed time-series data set and the second transformed time-series data set had been separately sent for analysis, and
   for each given anti-combined result value of the set of anti-combined result value(s), performing a transformation compensation on the given analysis-result value to yield a respectively corresponding anti-transformed analysis result value, with the transformation compensation being a fourth set of mathematical operation(s) that cause the anti-transformed analysis result value to at least substantially match an analysis result value that would have been obtained in an instance where the first time-series data set and second time-series data set had been sent for analysis.

10. The CS of claim 9 wherein:
the first set of mathematical operation(s) of the first linear transformation includes performing a first matrix algebra operation on the values of the first plurality of time-series values; and
the second set of mathematical operation(s) of the second linear transformation includes performing a second matrix algebra operation on the values of the second plurality of time-series values.

11. The CS of claim 9 wherein:
the first time-series data is confidential business data; and
the analysis results include a business related prediction.

12. The CS of claim 11 further comprising:
taking a business related action based, at least in part, upon the business related prediction, with the business related action including one of the following types of business related actions:
taking a staffing action, making an investment, foregoing an investment opportunity, making an inventory decision, and/or making a container allocation decision.

* * * * *